(12) United States Patent
Behrens et al.

(10) Patent No.: US 10,611,487 B2
(45) Date of Patent: Apr. 7, 2020

(54) VEHICLE AIR CONDITIONING PACK WITH AIR CYCLE ASSEMBLY

(71) Applicant: THE BOEING COMPANY, Chicago, IL (US)

(72) Inventors: William Webster Behrens, Berkeley, MO (US); Andrew Richard Tucker, Berkeley, MO (US)

(73) Assignee: THE BOEING COMPANY, Chicago, IL (US)

( * ) Notice: Subject to any disclaimer, the term of this patent is extended or adjusted under 35 U.S.C. 154(b) by 131 days.

(21) Appl. No.: 15/872,410

(22) Filed: Jan. 16, 2018

(65) Prior Publication Data

US 2019/0217960 A1    Jul. 18, 2019

(51) Int. Cl.
*B64D 13/08* (2006.01)
*B64D 13/06* (2006.01)

(52) U.S. Cl.
CPC ............ *B64D 13/08* (2013.01); *B64D 13/06* (2013.01); *B64D 2013/0618* (2013.01); *B64D 2013/0648* (2013.01)

(58) Field of Classification Search
CPC  B64D 13/08; B64D 2013/0618; B64D 13/02; B64D 2013/0611
See application file for complete search history.

(56) References Cited

U.S. PATENT DOCUMENTS

| | | | |
|---|---|---|---|
| 5,442,905 A * | 8/1995 | Claeys | B64D 13/06 454/71 |
| 5,887,445 A | 3/1999 | Murry et al. | |
| 5,899,085 A * | 5/1999 | Williams | B64D 13/06 62/236 |
| 9,656,756 B2 | 5/2017 | Atkey | |
| 2007/0113579 A1 | 5/2007 | Claeys et al. | |
| 2007/0266695 A1* | 11/2007 | Lui | B64D 13/06 60/204 |
| 2011/0107777 A1 | 5/2011 | Atkey et al. | |
| 2013/0133348 A1* | 5/2013 | Squier | B64D 13/08 62/172 |
| 2013/0318983 A1* | 12/2013 | Zhou | F02C 6/08 60/772 |

(Continued)

FOREIGN PATENT DOCUMENTS

| | | |
|---|---|---|
| EP | 1386837 A1 | 2/2004 |
| EP | 3173337 B1 | 5/2015 |
| EP | 2918497 B1 | 9/2015 |

OTHER PUBLICATIONS

Extended European Search Report for corresponding EP Application No. 19152077.4-1010 dated May 6, 2019 (5 pages).

*Primary Examiner* — Kun Kai Ma
(74) *Attorney, Agent, or Firm* — The Small Patent Law Group LLC; Philip S. Hof

(57) ABSTRACT

An air conditioning pack includes an air cycle assembly, a vapor cycle system, and a mixing duct. The air cycle assembly is configured to receive bleed air and utilize the bleed air to compress ram air. The vapor cycle system is configured to receive the compressed ram air and to reduce an operating temperature of the compressed ram air. The mixing duct is configured to receive the compressed ram air and mix the compressed ram air with the bleed air to generate a hybrid air stream that is used for cooling at least a portion of a vehicle.

20 Claims, 8 Drawing Sheets

(56) References Cited

U.S. PATENT DOCUMENTS

2015/0251766 A1\* 9/2015 Atkey .................... B64D 13/08
                                                            244/13
2016/0229542 A1   8/2016 Bruno et al.
2017/0057641 A1   3/2017 Koerner et al.

\* cited by examiner

VEHICLE AIR CONDITIONING PACK WITH AIR CYCLE ASSEMBLY

FIELD OF EMBODIMENTS OF THE DISCLOSURE

Embodiments of the present disclosure generally relate to systems and methods for conditioning air for use in cooling vehicles, such as commercial aircraft.

BACKGROUND OF THE DISCLOSURE

Known air conditioning systems used in transport vehicles, such as commercial aircraft, typically use an air-based thermodynamic cycle to provide cool, pressurized air to various interior compartments of the aircraft, such as a passenger cabin, cargo compartments, and the like. The known air conditioning systems are typically powered pneumatically by bleed air extracted from the compressor stages of vehicle engines, such as a gas turbine engine of an aircraft. The bleed air from the engine is at an elevated temperature and pressure. The air conditioning systems typically use ram air from the ambient environment outside of the vehicle to cool the bleed air. Once the bleed air is cooled and conditioned in the air conditioning system, the bleed air is then used for various vehicle cooling tasks. For example, the bleed air may be distributed into the passenger cabin for temperature control, ventilation, and pressurization within the passenger cabin. After flowing through the passenger cabin, the air can be discharged to the ambient environment through exhaust ports and/or valves.

However, the use of bleed air from the engine or other bleed air source for air conditioning diverts power that could otherwise be used for propulsion. For example, using bleed air to cool and condition the passenger cabin may reduce fuel economy and/or efficiency during operation of the vehicle because work is expended to generate the high pressure air that is not used for propulsion.

Furthermore, using ram air from outside the vehicle to cool the bleed air typically requires capturing ambient air and directing the ambient air into the vehicle through air intakes or vents. Directing air into the vehicle during movement of the vehicle for cooling the bleed air increases drag on the vehicle (relative to directing less ambient air into the vehicle). The increased drag may reduce fuel economy and efficiency because more energy may be needed to propel the vehicle through the ambient environment at a given velocity.

SUMMARY OF THE DISCLOSURE

Certain embodiments of the present disclosure provide an air conditioning package onboard a vehicle. As used herein, the air conditioning package may include or represent a self-contained air conditioning unit. For example, the air conditioning package according to one or more embodiments described herein may be self-contained within a housing or case, and optionally may be portable to enable the air conditioning pack to be installed on the vehicle. The term "air conditioning package" is also referred to herein as "air conditioning pack".

The air conditioning pack according to one or more embodiments includes an air cycle assembly, a vapor cycle system, and a mixing duct. The air cycle assembly is configured to receive bleed air and utilize the bleed air to compress ram air. The vapor cycle system is configured to receive the compressed ram air and to reduce an operating temperature of the compressed ram air. The mixing duct is configured to receive the compressed ram air and mix the compressed ram air with the bleed air to generate a hybrid air stream that is used for cooling at least a portion of a vehicle.

Certain embodiments of the present disclosure provide a vehicle that includes an air conditioning pack and a control circuit. The air conditioning pack includes an air cycle assembly, a vapor cycle system, and a mixing duct. The air cycle assembly is configured to receive bleed air and utilize the bleed air to compress ram air. The vapor cycle system is configured to receive the compressed ram air and to reduce an operating temperature of the compressed ram air. The mixing duct is configured to receive the compressed ram air and mix the compressed ram air with the bleed air to generate a hybrid air stream that is used for cooling at least a portion of the vehicle. The control circuit is operatively connected to the air conditioning pack. The control circuit is configured to control respective flow paths for the bleed air and the ram air through the air conditioning pack in different specific configurations based on one or more of a mode of operation of the vehicle or an ambient environmental condition outside of the vehicle.

Certain embodiments of the present disclosure provide a method for conditioning air for conditioning air for use in a vehicle. The method includes using bleed air received from a bleed air source to generate compressed ram air. The method includes reducing an operating temperature of the compressed ram air. The method also includes mixing the bleed air received from the bleed air source with the compressed ram air to generate a hybrid air stream, and utilizing the hybrid air stream to regulate a temperature of at least one compartment in the vehicle.

DETAILED DESCRIPTION OF THE DISCLOSURE

Certain embodiments of the present disclosure include an air conditioning pack that is configured to cool and condition air. Compared to known air conditioning systems, the air conditioning pack in the embodiments described herein extracts less bleed air from a bleed air source, such as a gas turbine engine or an auxiliary power unit, while satisfying air conditioning requirements. The embodiments of the air conditioning pack may increase fuel economy and efficiency of the vehicle during operation because a greater percentage of the bleed air can be used for vehicle propulsion. Furthermore, the air conditioning pack described herein may also require less ram air to be utilized during operation than known air conditioning systems, thereby reducing drag on the vehicle. The increased fuel economy and reduced drag can increase the range of the vehicle and reduce fuel costs.

The air conditioning pack according to the embodiments described herein includes a vapor cycle system that is selectively activated to provide a thermodynamic lift for rejecting heat, when needed. More specifically, the vapor cycle system includes a motor-driven refrigerant compressor that can be activated when a thermodynamic lift is needed and deactivated to reduce power consumption under certain conditions when a thermodynamic lift is not needed. As used herein, a "thermodynamic lift" refers to additional cooling (or heating, if necessary) of a fluid within a thermodynamic flow system that is provided using energy extracted from an external power source other than from one or more fluids within the thermodynamic flow system.

The air conditioning pack according to one or more embodiments of the present disclosure uses the pneumatic power of bleed air extracted from a bleed air source on the vehicle for compressing ram air. The ram air that is compressed may be cooled within an evaporator of the vapor cycle system. The ram air is mixed with the bleed air within a mixing duct to define a hybrid air stream that is discharged from an outlet port of the air conditioning pack. The discharged hybrid air stream is temperature-controlled and is used within the vehicle, such as directed into a passenger cabin of the vehicle for cooling, ventilation, and/or pressurization.

The output of certain known air conditioning systems is typically only bleed air, such that ram air is solely used for cooling the bleed air and then is exhausted from the vehicle. However, the air conditioning pack according to the embodiments of the present disclosure outputs a hybrid air stream that is a mixture of both bleed air and ram air. The pneumatic power of the bleed air is used for compressing the ram air to a designated pressure. If additional cooling of the compressed ram air is required (or desired) in certain conditions, the vapor cycle system can be activated to provide a thermodynamic lift.

Figure 1:
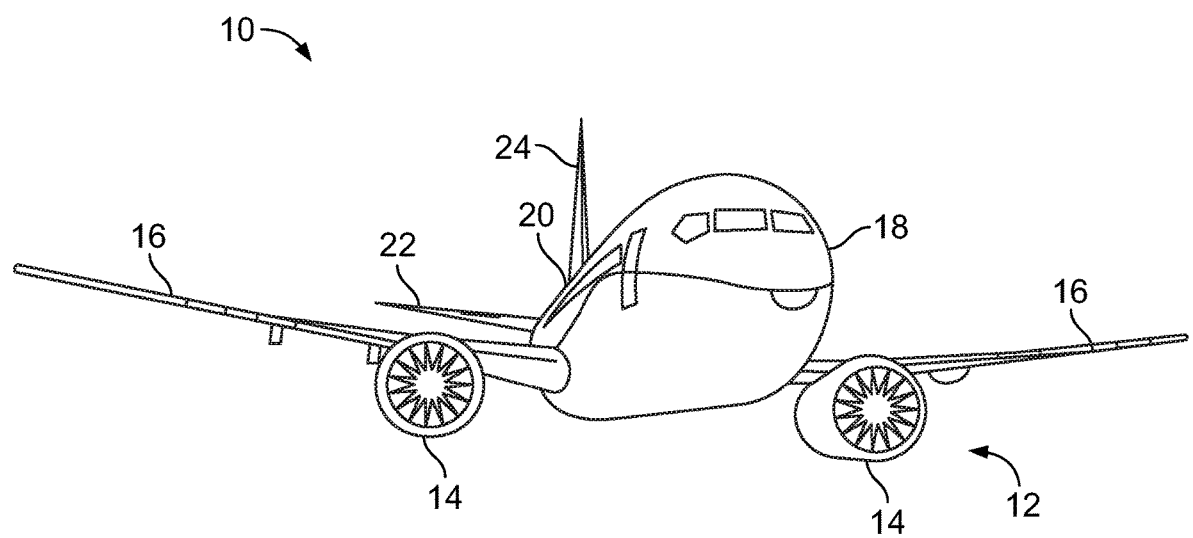
FIG. 1 illustrates a front perspective view of a vehicle according to an embodiment of the present disclosure.

FIG. 1 illustrates a front perspective view of a vehicle 10 according to an embodiment of the present disclosure. The vehicle 10 in the illustrated embodiment is an aircraft, and is referred to herein as aircraft 10. Specifically, the aircraft 10 shown in FIG. 1 may be a commercial aircraft. An aircraft is one non-limiting example embodiment of the vehicle described herein, and the vehicle 10 in other embodiments of the present disclosure may be another type of transport vehicle, such as a rail vehicle, a bus, an automobile, a sea craft, or the like. For example, the air conditioning pack described in various embodiments herein may be installed on various different vehicles for controlling a temperature, pressure, and ventilation of air within the vehicles. The various different vehicles that may include the air conditioning pack include commercial aircraft such as the aircraft 10 shown in FIG. 1, but are not limited to commercial aircraft.

The aircraft 10 in the illustrated embodiment includes a propulsion system 12 that may include two main engines 14 for propelling the aircraft 10. The main engines 14 may be gas turbine (e.g., turbofan) engines 14. Optionally, the propulsion system 12 may include more main engines 14 than shown. The main engines 14 may be carried by wings 16 of the aircraft 10. In other embodiments, the main engines 14 may be carried by a fuselage 18 and/or an empennage 20. The empennage 20 may also support horizontal stabilizers 22 and a vertical stabilizer 24. The fuselage 18 of the aircraft 10 defines an interior space 26 (shown in FIG. 2) that may include a passenger cabin 28, a flight deck 30, a cargo area 32 (all in FIG. 2), and the like.

Figure 2:
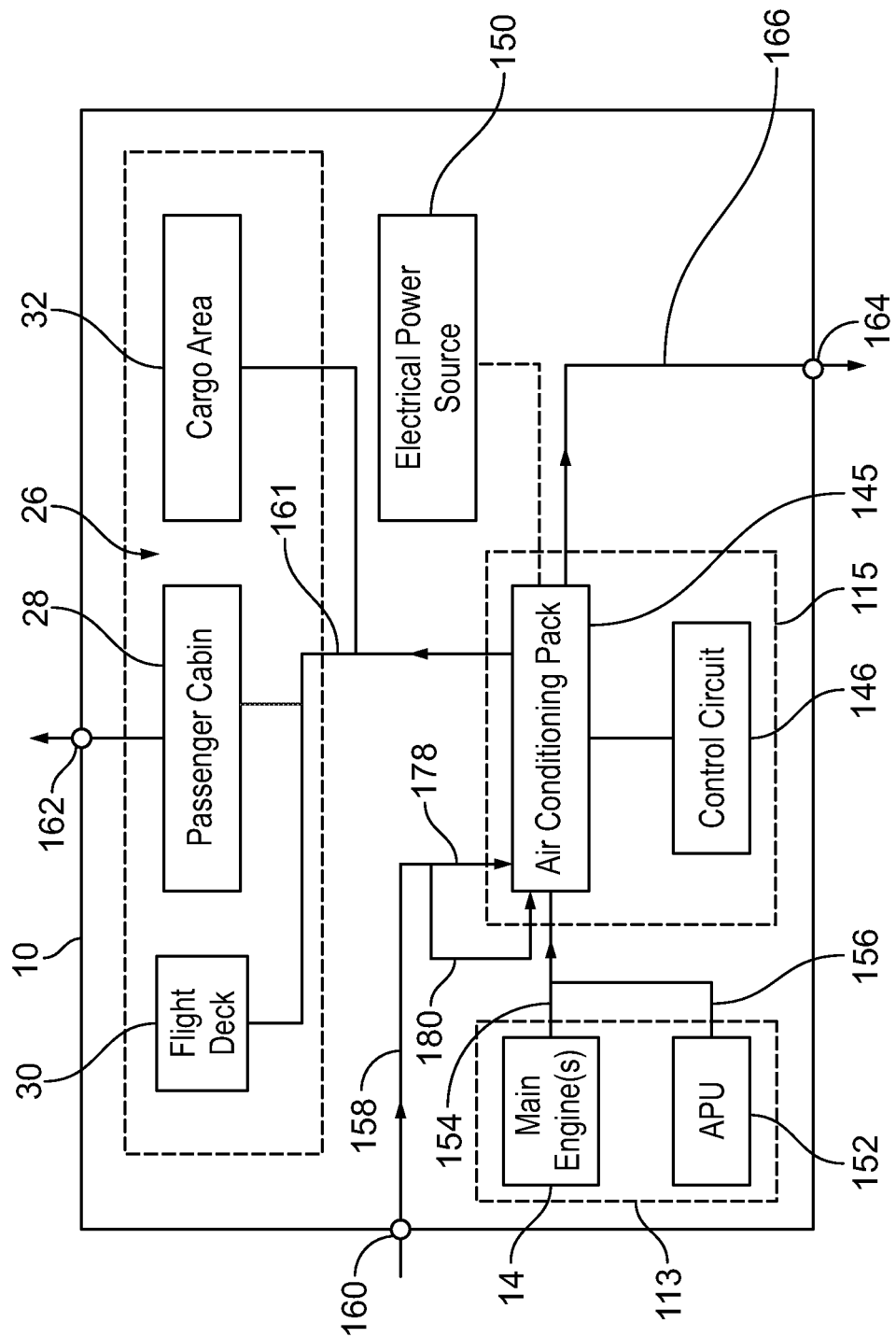
FIG. 2 is a schematic diagram of the vehicle according to an embodiment of the present disclosure.

FIG. 2 is a schematic diagram of the aircraft 10 according to an embodiment of the present disclosure. The diagram of the aircraft 10 in FIG. 2 shows components of the aircraft 10 that are used for generating and supplying conditioned air to the interior space 26 of the aircraft 10. For example, the aircraft 10 in the illustrated embodiment includes one or more power sources 113 and a cooling system 115. The one or more power sources 113 are configured to supply pressurized (e.g., compressed) air to the cooling system 115. The pressurized air from the one or more power sources 113 that is supplied to the cooling system 115 is herein referred to as "bleed air", and the power sources 113 are referred to as "bleed air sources".

The cooling system 115 is configured to extract energy from the bleed air to produce the conditioned air that is provided for various cooling and/or ventilation tasks in the aircraft 10. At least some of the conditioned air from the cooling system 115 may be distributed within the interior space 26, such as within the passenger cabin 28 where passengers are located, the flight deck 30 where pilots and/or other crew members are located, and/or the cargo area 32 where cargo (e.g., pets, luggage, bulk items, etc.) is stored. The conditioned air may have a designated temperature, pressure, and/or humidity. It is recognized that the components of the aircraft 10 shown in FIG. 2 are relevant to air conditioning, and that the aircraft 10 may have various additional components, systems, devices, and the like that are not shown in FIG. 2.

The cooling system 115 includes an air conditioning pack 145 and a control circuit 146. The air conditioning pack 145 is a system with various air-handling and thermal management components and devices, such as heat exchangers, compressors, turbines, valves, and ducts, which are shown and described in detail with reference to FIGS. 3-7. The air conditioning pack 145 according to the embodiments described herein provides pressurization, ventilation, and temperature control for the aircraft 10 throughout an entire operational period of the aircraft 10. For example, the air conditioning pack 145 is configurable for use in a ground mode of operation of the aircraft 10 while the aircraft 10 is static at ground level, in a cruise flight mode of the operation of the aircraft 10 while the aircraft 10 is flying at cruise level, and any flight conditions or modes therebetween.

In one or more embodiments, the air conditioning pack 145 may be a unitary, integral system, such that the components of the air conditioning pack 145 may be commonly disposed within a single housing or case. Optionally, various components of the air conditioning pack 145, such as the control circuit 146 as one example, may be located on an exterior surface of the housing or case, or may be installed remotely from the air conditioning pack 145. The air conditioning pack 145 may be sufficiently compact and lightweight to be hand carried. As a result, the air conditioning pack 145 may be relatively simple to install within an aircraft 10 containing an existing bleed-air based air conditioning system by loading the housing into position in the aircraft 10 and making corresponding connections among ductwork, tubes, electrical power outlets, and the like.

The control circuit 146 is operably coupled to the air conditioning pack 145 and is configured to control operation of the air conditioning pack 145. For example, the control circuit 146 may be used to (i) open and close valves, (ii) activate and deactivate switches, motors, and/or fans, (iii) monitor various parameters, such as system temperatures and pressures, aircraft compartment temperatures, external ambient temperatures, aircraft altitude, aircraft speed, and the like. The control circuit 146 may be configured to open and close certain specific valves to reconfigure the air flow path through the air conditioning pack 145 based on the various inputs received at the control circuit 146. As an example, the control circuit 146 may reconfigure the air flow path through the air conditioning pack 145 based on different operating modes of the aircraft 10 (e.g., cruise flight or ground) and/or based on ambient environmental conditions outside of the aircraft 10 (e.g., hot day or cold day).

In one or more embodiments described herein, the air conditioning pack 145 is configurable in one or more ground configurations for use while the aircraft 10 is in the ground mode of operation, and is configurable in one or more cruise flight configuration for use while the aircraft 10 is in the cruise flight mode of operation.

Figure 3:
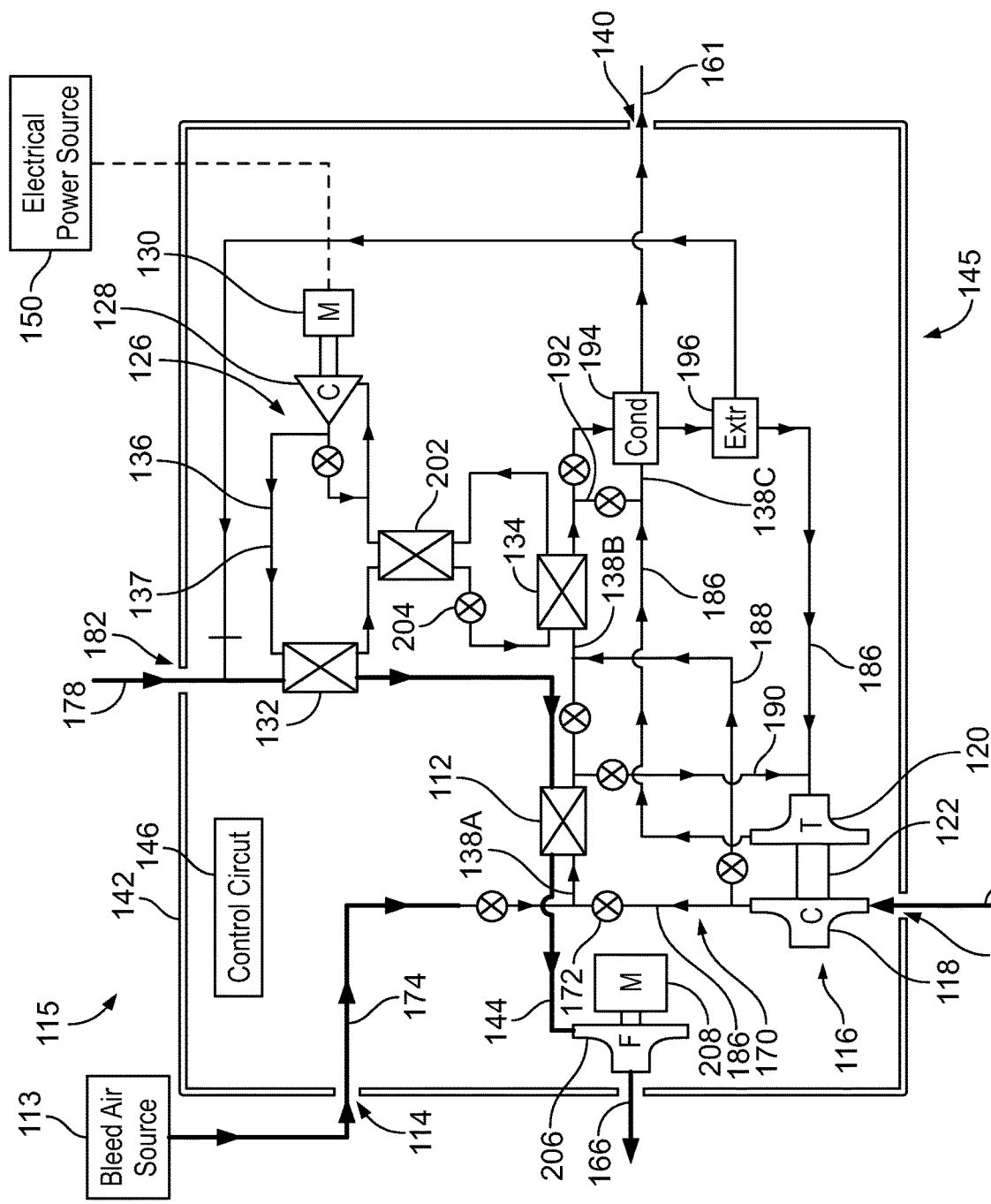
FIG. 3 is a schematic representation of a cooling system of the vehicle according to an embodiment of the present disclosure illustrating a system architecture of an air conditioning pack.
Figure 4:
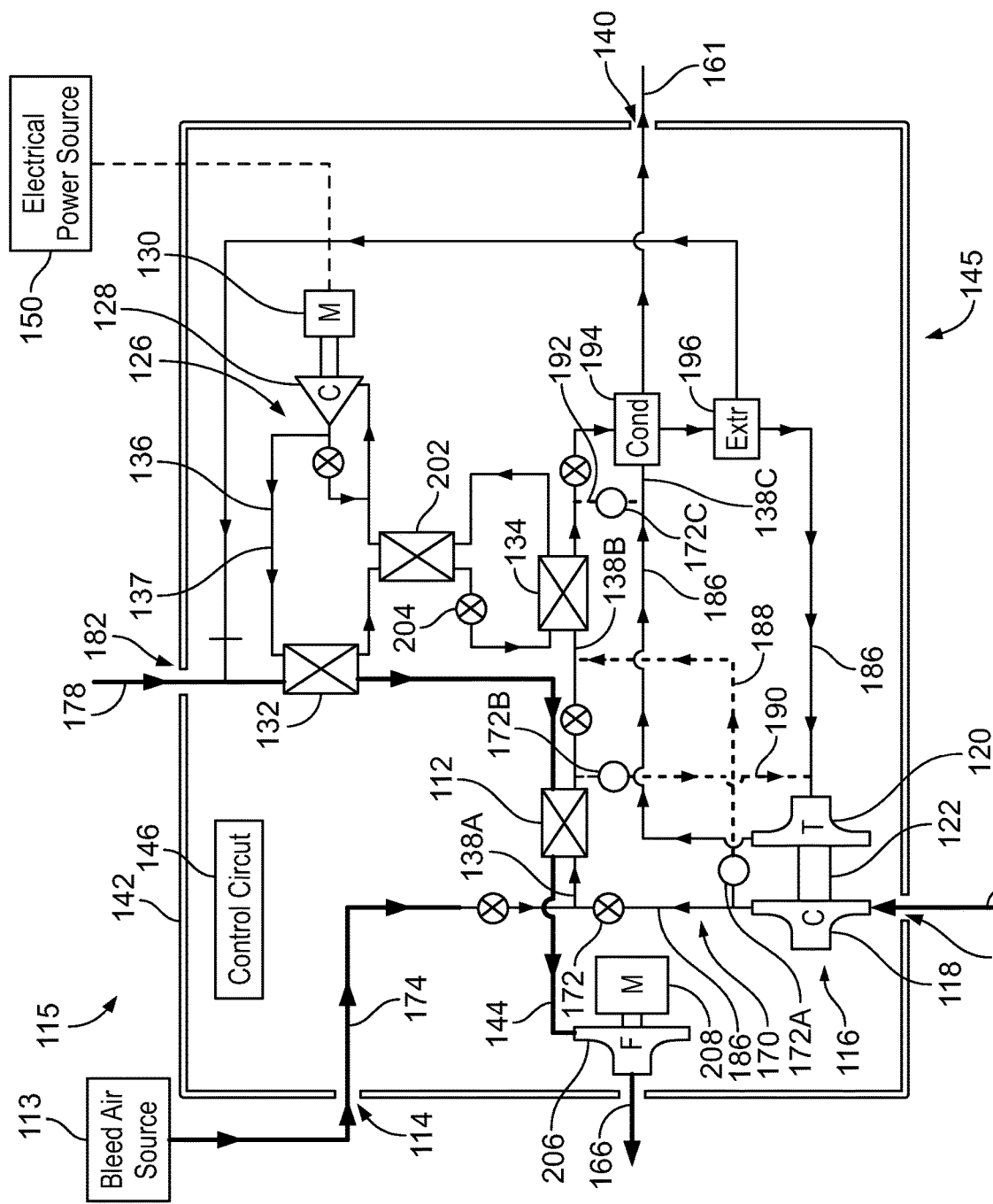
FIG. 4 is a schematic diagram of a cooling system showing the air conditioning pack in a first ground configuration, according to an embodiment of the present disclosure.
Figure 5:
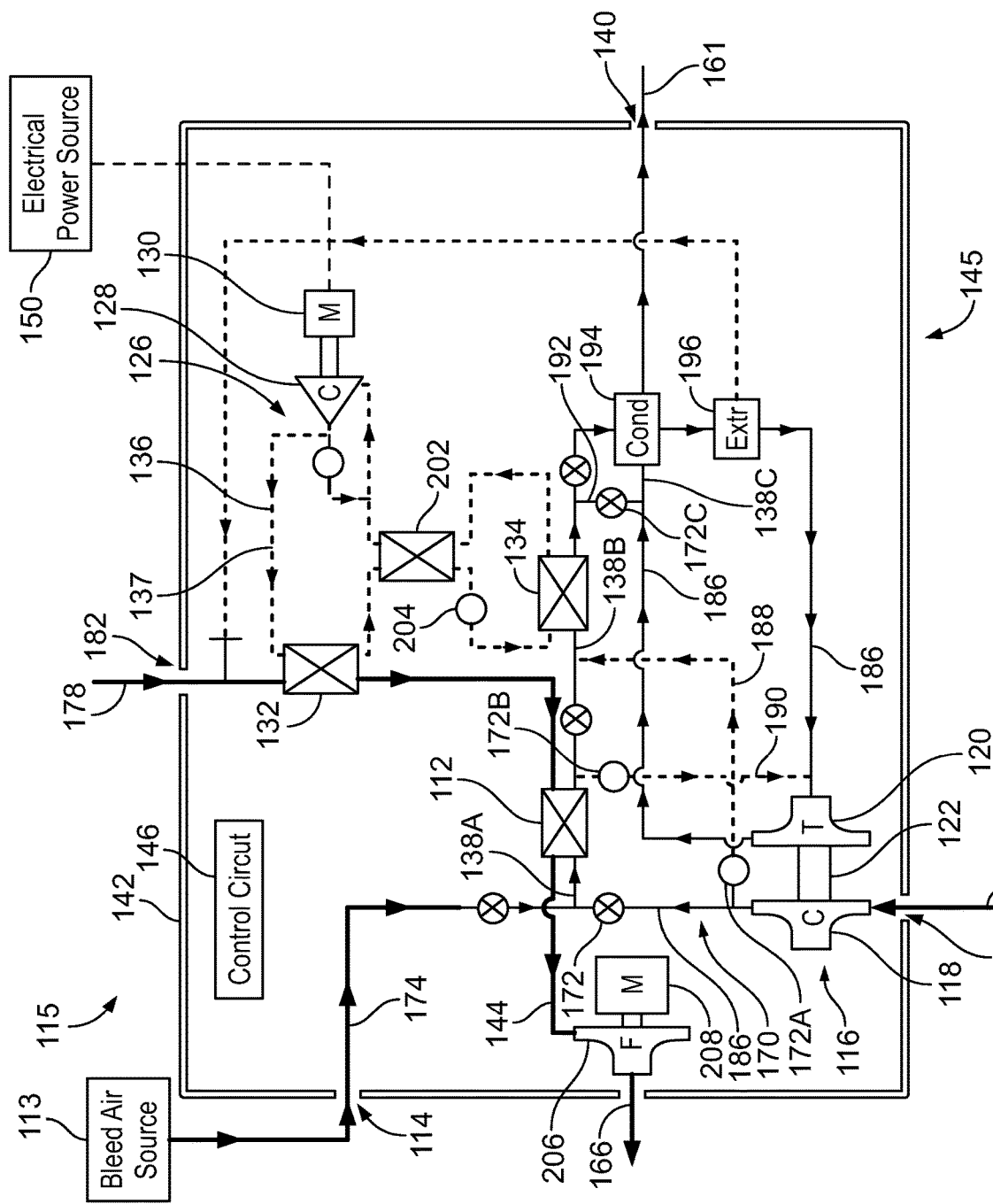
FIG. 5 is a schematic diagram of the cooling system showing the air conditioning pack in a second ground configuration, according to an embodiment of the present disclosure.

In the one or more ground configurations, the air conditioning pack 145 may supply conditioned air for temperature control and ventilation within the interior space 26 of the aircraft 10 to increase the comfort of the passengers while loading and unloading the passenger cabin 28 and for the flight crew while preparing for an upcoming flight. Various ground configurations of the air conditioning pack 145 are shown and described with reference to FIGS. 4 and 5. For example, FIG. 4 represents a first ground configuration, and FIG. 5 represents a second ground configuration. In both the first and second ground configurations, an auxiliary power unit 152 of the aircraft 10 is used as the bleed air source 113 that supplies bleed air to the air conditioning pack 145. The air conditioning pack 145 uses the bleed air to compress the ram air such that the pressure of the ram air is substantially the same as the pressure of the bleed air received from the auxiliary power unit 152 (e.g., within a designated range of the bleed air pressure). The compressed ram air is then mixed with the bleed air, and the two air streams are cooled together within the air conditioning pack 145. In the first ground configuration shown in FIG. 4, a vapor cycle system 126 (shown in FIG. 3) provides a cooling boost for the mixed ram and bleed air streams to reduce the operating temperature of a supply air stream that is discharged from the air conditioning pack 145 for use within the aircraft 10. The first ground configuration may be used when the temperature of the ambient environment outside of the aircraft 10 at ground level is at or above a designated threshold temperature. The second ground configuration shown in FIG. 5 differs from the first ground configuration because the vapor cycle system 126 of the air conditioning pack 145 does not operate (e.g., is inactive). The second ground configuration may be used when the ambient temperature is less than the designated threshold temperature. For example, if the ambient temperature is zero degrees Fahrenheit, then the ram air stream may be sufficiently cool that the cooling boost from the vapor cycle system 126 is not necessary.

Figure 6:
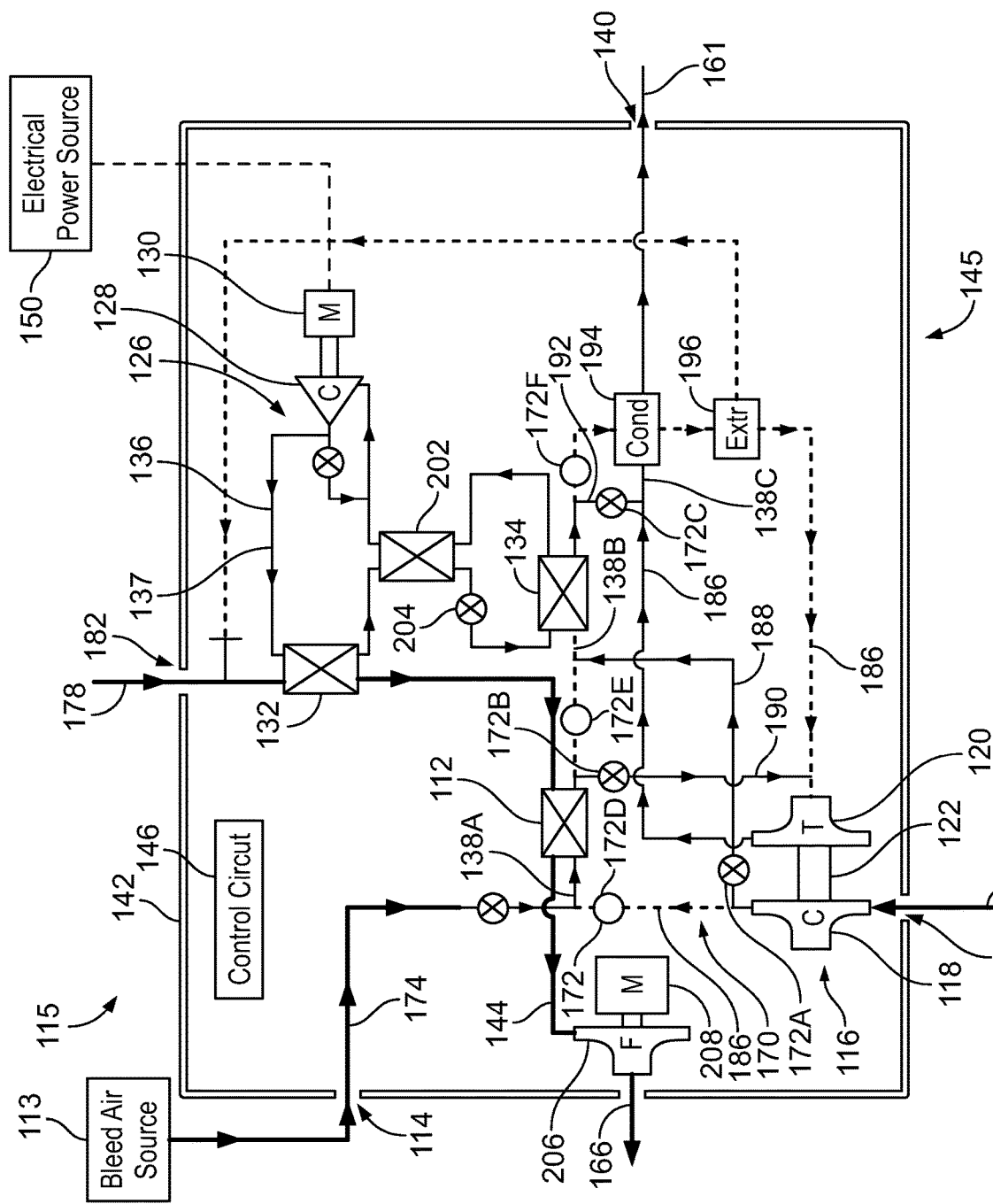
FIG. 6 is a schematic diagram of the cooling system showing the air conditioning pack in a first cruise flight configuration, according to an embodiment of the present disclosure.
Figure 7:
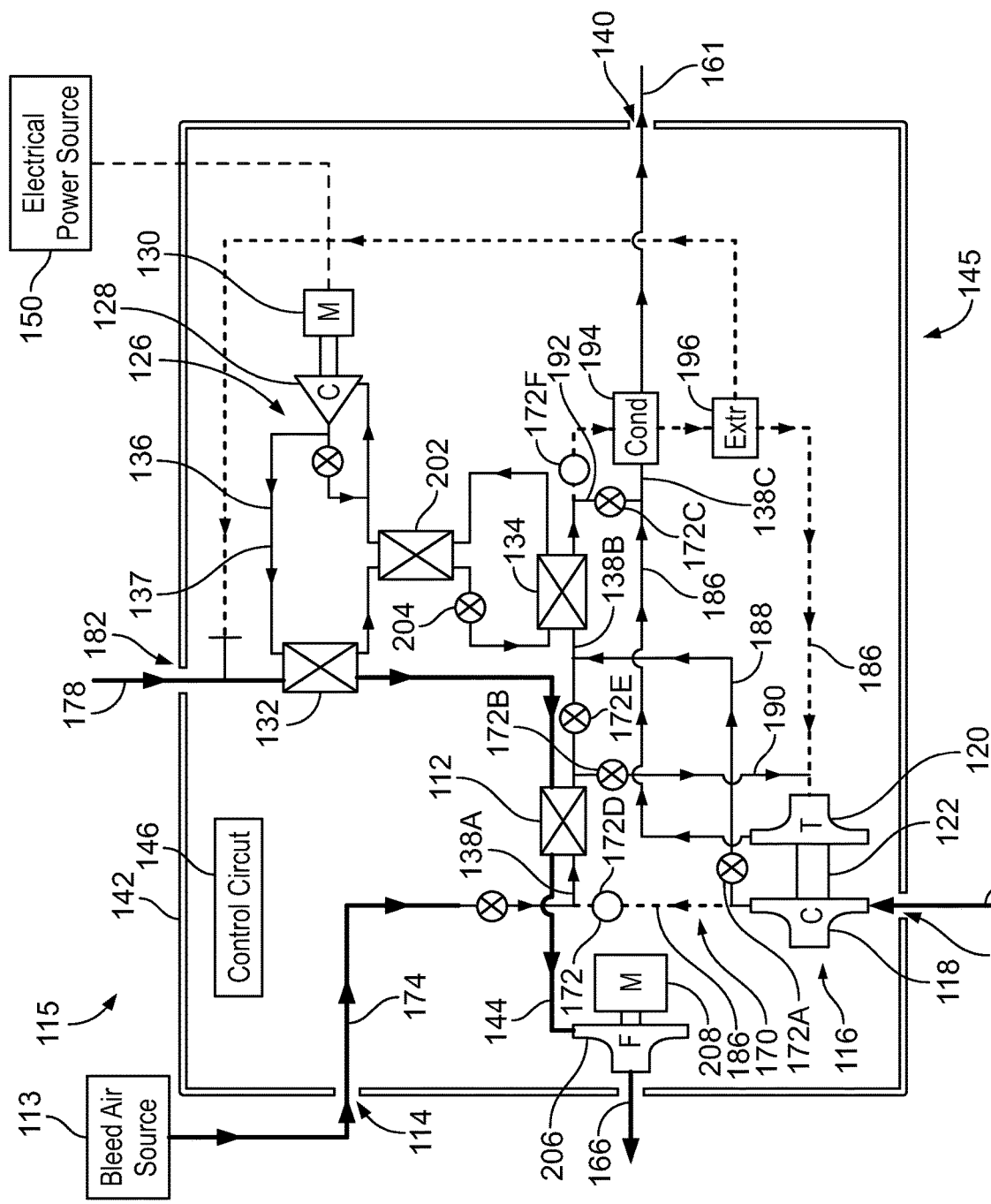
FIG. 7 is a schematic diagram of the cooling system showing the air conditioning pack in a second cruise flight configuration, according to an embodiment of the present disclosure.

In the one or more cruise flight configurations, the air conditioning pack 145 may supply conditioned air for pressurization of the interior space 26, as well as for temperature control and ventilation of the interior space 26. The conditioned air may increase the comfort of the passengers and crew while the aircraft 10 is cruising at altitude. Various cruise flight configurations of the air conditioning pack 145 are shown and described with reference to FIGS. 6 and 7. For example, FIG. 6 represents a first cruise flight configuration, and FIG. 7 represents a second cruise flight configuration. In both the first and second cruise flight configurations, at least one of the main engines 14 of the aircraft 10 is used as the bleed air source 113. The air conditioning pack 145 uses the bleed air to compress the ram air such that the pressure of the ram air is substantially the same as the pressure of the passenger cabin 28 (e.g., within a designated range of the cabin air pressure). At least some of the bleed air is cooled separately from the ram air within the air conditioning pack 145, although the bleed air mixes with the ram air prior to discharge from the air conditioning pack 145. For example, in the first cruise flight configuration shown in FIG. 6, only the bleed air is cooled within a heat exchanger 112 and only the bleed air is expanded through a turbine 120. Furthermore, only the ram air is cooled by the vapor cycle system 126 of the air conditioning pack 145, which operates to provide the cooling boost for the ram air. In the second cruise flight configuration shown in FIG. 7, a portion of the bleed air mixes with the ram air upstream of the vapor cycle system 126 such that vapor cycle system 126 provides a cooling boost for the ram air and some of the bleed air. The second cruise flight configuration may be used instead of the first cruise flight configuration due to various conditions, such as when the aircraft 10 is cruising at an altitude that is greater than a standard altitude. Directing some of the bleed air to the vapor cycle system 126 reduces the flow rate of bleed air through the turbine 120, which may reduce the flow rate of ram air through the air conditioning pack 145, allowing for better control of the air conditioning pack 145.

Although not shown in FIGS. 6 and 7, the air conditioning pack 145 may have two more cruise flight configurations. For example, a third cruise flight configuration may define the same air flow path as the first cruise flight configuration of FIG. 6, except that the vapor cycle system 126 is inactive. Likewise, a fourth cruise flight configuration may be the same as the second cruise flight configuration shown in FIG. 7, except that the vapor cycle system 126 is inactive. The vapor cycle system 126 may be turned off when the ambient temperature at altitude outside of the aircraft 10 is below a designated threshold temperature because the ram air may be sufficiently cool that excess cooling is unnecessary. The control circuit 146 may be configured to control the different configurations of the air conditioning pack 145, as described herein.

The control circuit 146 includes and/or represents one or more hardware circuits or circuitry that include, are connected with, or that both include and are connected with one or more processors, controllers, and/or other hardware logic-based devices. The control circuit 146 may include a central processing unit (CPU), one or more microprocessors, a graphics processing unit (GPU), or any other electronic component capable of processing inputted data according to specific logical instructions. For example, the control circuit 146 may execute instructions stored on a tangible and non-transitory computer readable storage medium (e.g., a memory device). For example, the control circuit 146 may be configured to activate or deactivate certain valves in the air conditioning pack 145 to alter the air flow path according to instructions stored on a memory device in response to certain triggering events. Triggering events may include an input received from an operator input device (e.g., an operator manually selecting a specific configuration of the air conditioning pack 145 via a keyboard, handheld input device, or the like). Other triggering events for the control circuit 146 to reconfigure the flow path of the air conditioning pack 145 may be based on detected operating conditions of the aircraft 10 and/or detected ambient environmental conditions, as described in more detail herein. The control circuit 146 may be operably coupled to the air conditioning pack 145 via one or more wired control lines or wireless communication links, such that the control circuit 146 may communicate control signals along wired paths or wirelessly to various valves and other devices of the air conditioning pack 145.

The aircraft 10 also includes an electrical power source 150 that supplies electrical power for various components and systems onboard the aircraft 10. The electrical power source 150 is electrically (e.g., conductively and/or inductively) connected to the air conditioning pack 145 to power a motor 130 of the air conditioning pack 145, which is shown in FIG. 3. The electrical power source 150 may include or represent a battery, a generator, an alternator, and/or the like.

The aircraft 10 in the illustrated embodiment includes multiple bleed air sources 113 that are configured to supply bleed air to the air conditioning pack 145 of the cooling system 115. Specifically, the aircraft 10 includes the main engines 14 and an auxiliary power unit 152 (abbreviated as "APU" in FIG. 2) that represent bleed air sources 113. The main engines 14 receive air that is drawn into a compressor (not shown) of the respective main engine 14, in which the air is compressed before flowing into a combustion chamber (not shown) where the air is combusted with fuel to generate thrust for propelling the aircraft 10. The air is drawn into the compressor from outside of the aircraft 10. At least one of the main engines 14 includes a bleed port (not shown) along an intermediate stage of the compressor that is configured to allow pressurized bleed air to exit the main engine 14 prior to entering the combustion chamber. The bleed air from the at least one main engine 14 may be conveyed through a bleed air duct 154 to the air conditioning pack 145.

The auxiliary power unit 152 may be a gas turbine engine onboard the aircraft 10. The auxiliary power unit 152 generates power for powering loads rather than propelling the aircraft 10. Additionally, the auxiliary power unit 152 may also generate pressurized bleed air for use by the air conditioning pack 145 during ground operation of the aircraft 10 while the main engines 14 are inactive. Like the main engine 14, the auxiliary power unit 152 may receive air from outside of the aircraft 10 and may pressurize the air within a compressor (not shown) of the auxiliary power unit 152 to generate the bleed air. The auxiliary power unit 152 may also provide electricity and/or shaft power that can be used for main engine start and powering electrical loads (e.g., lights and instruments). The bleed air from the auxiliary power unit 152 may be conveyed through a bleed air duct 156 to the air conditioning pack 145. The bleed air duct 156 optionally may combine with the bleed air duct 154 from the at least one main engine 14 as shown in FIG. 2.

In addition to receiving bleed air, the air conditioning pack 145 of the cooling system 115 receives ram air through a ram air duct 158 of the aircraft 10. The ram air duct 158 extends from a ram air intake 160 on an exterior surface of the aircraft 10 to the air conditioning pack 145. The ram air intake 160 may be a scoop or vent through which ram air enters the aircraft 10. The ram air is ambient air outside of the aircraft 10 that flows into the aircraft 10 due to the movement of the aircraft 10.

In at least one embodiment, the air conditioning pack 145 receives both bleed air from the bleed air source 113 (e.g., the main engine 14 and/or the auxiliary power unit 152) and ram air. The air conditioning pack 145 extracts energy from the bleed air for pressurizing (e.g., compressing) the ram air. The ram air mixes with the bleed air within the air conditioning pack 145 to define a hybrid air stream. The hybrid air stream is discharged from the air conditioning pack 145 as conditioned air that is distributed via supply air ducts 161 to the passenger cabin 28 and/or other areas within the interior space 26 of the aircraft 10. The hybrid air stream is conditioned by the air conditioning pack 145 to provide interior temperature control, humidity control, ventilation, and pressurization within the aircraft 10. The hybrid air stream blends with the air within the passenger cabin 28 and may be discharged from the aircraft 10 through an outflow port 162 of the aircraft 10. In one or more embodiments, some of the ram air received within the air conditioning pack 145 from the ram air duct 158 is not compressed, but rather is used as a refrigerant for absorbing heat within the air conditioning pack 145. For example, this portion of ram air may be used to absorb heat from the bleed air. The portion of the ram air used to absorb heat exits the air conditioning pack 145 and is directed within an exhaust duct 166 to an exhaust port 164 of the aircraft 10, where the heated ram air is released from the aircraft 10.

FIG. 3 is a schematic representation of the cooling system 115 of the aircraft 10 according to an embodiment of the present disclosure illustrating a system architecture of the air conditioning pack 145. The system architecture of the air conditioning pack 145 shown in FIG. 3 is an example embodiment, and the air conditioning pack 145 is not intended to be limited to the system architecture shown in FIG. 3.

The air conditioning pack 145 includes a heat exchanger 112, an air cycle assembly 116, and a vapor cycle system 126. The heat exchanger 112 and the air cycle assembly 116 are disposed along an air conditioning flow circuit 170 that includes a series of interconnected air-handling members and valves 172 that control air flow through the air-handling members. The air-handling members are referred to herein as ducts, although the term "duct" is not intended to be limiting to a certain type of air-handling member, and may include various conduits, chutes, tubes, hoses, and the like, for directing air flow along defined paths. The bleed air and the ram air flows through the air conditioning flow circuit 170.

The air conditioning pack 145 also includes a ram air heat sink circuit 144 that conveys an air stream through the air conditioning pack 145. Heat from the air within the air conditioning flow circuit 170 is rejected into the ram air heat sink circuit 144. The respective flow paths for the bleed air and ram air through the air conditioning flow circuit 170 is affected by selectively controlling (e.g., opening and closing) the various valves 172 located along the air conditioning flow circuit 170. The control circuit 146 may automatically control the states or positions of the valves 172 by communicating control signals to the valves. The control circuit 146 may communicate the control signals to the corresponding valves 172 wirelessly and/or through conductive wires. In FIGS. 3-7, the valves 172 with an "X" in the symbol represent open or at least partially open valves that allow fluid flow therethrough, and the valves 172 that have blank symbols (e.g., lacking an "X") represent closed valves that block fluid flow therethrough.

The air cycle assembly 116 includes a compressor 118, referred to herein as an air compressor 118, and a turbine 120 that are mechanically coupled to each other via a shaft 122. For example, rotation of the turbine 120 causes the shaft 122 to rotate, which rotates the air compressor 118 as well. The air compressor 118 and the turbine 120 may each include one or more stages of rotating blades and stationary vanes (not shown). In one or more embodiments described herein, the turbine 120 receives bleed air and expands the bleed air through the turbine 120. The turbine 120 extracts energy from the bleed air that passes through the turbine 120, and the energy is used as pneumatic power to drive rotation of the air compressor 118 (via the shaft 122).

The vapor cycle system 126 includes a refrigerant loop 136 that contains a refrigerant. The refrigerant may represent or include a standard refrigerant, such as but not limited to R-134a. The refrigerant loop 136 may be defined by a series of interconnected tubes 137 in a closed loop. The vapor cycle system 126 includes various components disposed along the refrigerant loop 136, including a compressor 128 (referred to herein as a refrigerant compressor 128), a condenser 132, a refrigerant subcooler 202, and an evaporator 134. The refrigerant compressor 128 is driven by a motor 130. The motor 130 may be an electric motor that is powered by the electrical power source 150.

In at least one embodiment, the air conditioning pack 145 includes a housing 142 or case, and at least some of the components of the air conditioning pack 145 are disposed within the housing 142. For example, in the illustrated embodiment, the heat exchanger 112, the air cycle assembly 116, and the vapor cycle system 126 are all disposed within the housing 142. A portion of the ram air heat sink circuit 144 is also disposed within the housing 142. For example, the housing 142 includes a ram air circuit inlet port 182 to enable ram air to be channeled from the ram air duct 178 to the portions of ram air heat sink circuit 144 that are disposed within the housing 142. The housing 142 may be composed of a rigid material, such as one or more plastics and/or metals. The control circuit 146 is disposed within and/or on the housing 142 in the illustrated embodiment, but the control circuit 146 may be located remote from (e.g., outside of and spaced apart from) the housing 142 in another embodiment. In one or more other embodiments, all or portions of the heat exchanger 112 and/or the vapor cycle system 126 may be disposed outside of the housing 142.

The air conditioning pack 145 includes a bleed air inlet port 114 that is in flow communication with the heat exchanger 112 via a bleed air inlet duct 174. The bleed air inlet duct 174 is connected to (or an extension of) the bleed air ducts 154, 156 (shown in FIG. 2) that extend from the one or more bleed air sources 113. Bleed air from the one or more bleed air sources 113 is conveyed into the air conditioning pack 145 through the bleed air inlet port 114 and to the heat exchanger 112.

The heat exchanger 112 provides heat transfer between the air conditioning flow circuit 170 and the ram air heat sink circuit 144. Within the heat exchanger 112, heat from the bleed air only, or heat from both the bleed air and the compressed ram air, is rejected into air within the ram air heat sink circuit 144. The heat exchanger 112 may be configured to allow heat transfer without allowing mass transfer between the two air streams. The air within the ram air heat sink circuit 144 may include ram air, recirculated air from the interior space 26 (FIG. 2) of the aircraft 10, or the like.

In at least one embodiment, the ram air duct 158 of the aircraft 10 may split into a first duct 178 and a second duct 180. The first duct 178 connects to the air conditioning pack 145 at the ram air circuit inlet port 182 in the housing 142 and is in flow communication with the ram air heat sink circuit 144. The second duct 180 connects to the air conditioning pack 145 at a ram air inlet port 124 in the housing 142 and is in flow communication with the air conditioning flow circuit 170. The ram air within the first duct 178 enters the ram air heat sink circuit 144 and is used to absorb heat from the bleed air only or the bleed air and compressed ram air at the heat exchanger 112. The ram air within the second duct 180 enters the air conditioning flow circuit 170 and is compressed by the air compressor 118 of the air cycle assembly 116.

The air compressor 118 is powered by the energy extracted from the bleed air within the turbine 120. For example, depending on the configuration of the air conditioning pack 145, up to 100% of the bleed air received within the bleed air inlet port 114 may be directed through the turbine 120 to be used for compressing ram air within the air compressor 118. The turbine 120 receives the bleed air downstream of the heat exchanger 112. The heat exchanger 112 is used to reduce an operating temperature of the bleed air prior to entering the turbine 120. For example, reducing the temperature of the bleed air that enters the turbine 120 may prevent the high temperature bleed air from damaging the turbine 120 and/or may allow for better control of the operation of the turbine 120.

The vapor cycle system 126 is configured to provide, when necessary, a thermodynamic lift for additional cooling, of bleed air and compressed ram air, or of compressed ram air only. For example, the evaporator 134 of the vapor cycle system 126 provides heat transfer between the air conditioning flow circuit 170 and the refrigerant loop 136. The evaporator 134 receives the ram air downstream of the air compressor 118, such that the compressed ram air received at the evaporator 134 is pressurized. Within the evaporator 134, heat from the ram air is transferred to the refrigerant within the refrigerant loop 136, which cools the ram air. In one or more ground configurations of the air conditioning pack 145, bleed air may be mixed with the ram air upstream of the evaporator 134 such that the bleed air also flows through the evaporator 134. The heat absorbed by the refrigerant will cause at least some of the refrigerant to evaporate from the liquid phase to the gas phase. The vapor cycle system 126 is a refrigeration system that is powered by the motor 130 that drives the refrigerant compressor 128.

The ram air within the air conditioning flow circuit 170 mixes with the bleed air to define a hybrid air stream. The ram air mixes with the bleed air within one of several mixing ducts 138A, 138B, 138C along the air conditioning flow circuit 170. For example, the air conditioning flow circuit 170 includes a first mixing duct 138A, a second mixing duct 138B, and a third mixing duct 138C. The ram air may mix with the bleed air within a different one of the mixing ducts 138A, 138B, 138C depending on the current configuration of the air conditioning pack 145, as described in more detail herein. The hybrid air stream is discharged from the air conditioning pack 145 through an outlet port 140. The outlet port 140 may be defined in the housing 142. The hybrid air stream discharged from the air conditioning pack 145 is conditioned, such that the hybrid air stream is at a controlled temperature, humidity, and pressure. The hybrid air stream may be used for various cooling tasks on the aircraft 10, such as (but not limited to) cooling, ventilating, and pressurizing the flight deck 30 and the passenger cabin 28 (both shown in FIG. 2).

The ducts define multiple flow paths or lines through the air conditioning flow circuit 170. For example, the air conditioning flow circuit 170 includes a primary line 186 along which the air compressor 118, heat exchanger 112, the evaporator 134, and the turbine 120 are located. The components along the primary line 186 are in series. For example, ram air can flow through the primary line 186, flowing through the air compressor 118, the heat exchanger 112, the evaporator 134, and the turbine 120 in that order, before being discharged through the outlet port 140. In the illustrated embodiment, the air conditioning flow circuit 170 also includes a condenser 194 and a water extractor 196 or separator disposed along the primary line 186 between the evaporator 134 and the turbine 120. The air conditioning flow circuit 170 also includes a heat exchanger bypass line 188, an evaporator bypass line 190, and a bypass line 192. The heat exchanger bypass line 188 extends between the air compressor 118 and the evaporator 134 and bypasses the heat exchanger 112. The evaporator bypass line 190 extends between the heat exchanger 112 and the turbine 120 and bypasses the evaporator 134, as well as the condenser 194 and the water extractor 196. The hot bypass line 192 extends between the evaporator 134 and the outlet port 140 and bypasses the turbine 120, as well as the condenser 194 and the water extractor 196. The valves 172 are controlled by the control circuit 146 to selectively direct ram air and bleed air through the various lines 186, 188, 190, 192 of the air conditioning flow circuit 170, as described in more detail herein.

FIG. 4 is a schematic diagram of the cooling system 115 showing the air conditioning pack 145 in a first ground configuration, according to an embodiment of the present disclosure. The air conditioning pack 145 is configurable in various configurations by the control circuit 146 individually controlling the states or positions of the valves 172 along the air conditioning flow circuit 170. The control circuit 146 controls the states of the valves 172 by communicating electrical control signals to the valves 172 along wired paths or via wireless communication links. In at least one embodiment, the air conditioning pack 145 is set in the first ground configuration when the aircraft 10 is at ground level and not in flight.

In the illustrated embodiment, the air conditioning pack 145 in the first ground configuration directs air flow along the primary line 186 such that the air does not bypass any of the heat exchanger 112, the evaporator 134, or the turbine 120. The air conditioning pack 145 achieves the first ground configuration when the control circuit 146 closes a first bypass valve 172A, a second bypass valve 172B, and a third bypass valve 172C. The first bypass valve 172A is disposed along the heat exchanger bypass line 188, and closing the first bypass valve 172A prevents ram air that is pressurized in the air compressor 118 from flowing through the heat exchanger bypass line 188. The second bypass valve 172B is disposed along the evaporator bypass line 190, and closing the second bypass valve 172B prevents bleed air that is discharged from the heat exchanger 112 from flowing through the evaporator bypass line 190. The third bypass valve 172C is disposed along the hot bypass line 192, and closing the third bypass valve 172C prevents air that is discharged from the evaporator 134 from flowing through the hot bypass line 192. Valves 172 that are disposed along the primary line 186 are set or retained in the open position to allow air flow through the primary line 186. As shown in FIGS. 4-7, solid flow lines represent flow lines that have fluid flow therethrough, and dotted flow lines represent flow lines with no fluid flow therethrough. In FIG. 4, the bypass valves 172A, 172B, 172C are closed, so no fluid flows through the bypass lines 188, 190, and 192, which are shown as dotted lines.

When in the first ground configuration, the air conditioning pack 145 receives bleed air from the auxiliary power unit 152 (shown in FIG. 2) that represents the bleed air source 113 (FIGS. 2 and 3). The main engines 14 (shown in FIGS. 1 and 2) may be off or idling when the aircraft 10 is on the ground, so bleed air is supplied by the auxiliary power unit 152. For example, the control circuit 146 of the cooling system 115, or another control circuit on the aircraft 10, may control valves (not shown) along the bleed air ducts 154, 156 (FIG. 2) outside of the air conditioning pack 145 to supply bleed air from the auxiliary power unit 152 without supplying bleed air from the main engines 14. The bleed air enters the air conditioning flow circuit 170 through the bleed air inlet port 114 (FIG. 3) and flows along the bleed air inlet duct 174.

The air compressor 118 of the air cycle assembly 116 receives ram air through the ram air inlet port 124 (FIG. 3) along the second duct 180. The air compressor 118, when in the first ground configuration, may compress the ram air to a pressure that corresponds to the pressure of the bleed air supplied to the air conditioning pack 145 by the auxiliary power unit 152 (FIG. 2). For example, the pressure of the ram air discharged by the air compressor 118 may match the pressure of the bleed air from the auxiliary power unit 152 within a designated range of the bleed air pressure. The designated range may be within 1%, 3%, or 5% of the bleed air pressure. In the first ground configuration, the ram air discharged by the air compressor 118 mixes with the bleed air in the first mixing duct 138A upstream of the heat exchanger 112. The ram air mixed or blends with the bleed air to define a hybrid air stream. The hybrid air stream flows through the heat exchanger 112, where heat is transferred from the hybrid air stream to the air stream within the ram air heat sink circuit 144 to cool the hybrid air stream.

In the first ground configuration, the heat exchanger 112 and the evaporator 134 of the vapor cycle system 126 are disposed in series along the primary line 186 of the air conditioning flow circuit 170. The hybrid air stream downstream of the heat exchanger 112 flows through the evaporator 134 of the vapor cycle system 126. The evaporator 134 reduces the operating temperature of the hybrid air stream by transferring heat into the refrigerant within the refrigerant loop 136 of the vapor cycle system 126. The subcooler 202 further heats the refrigerant and the vaporized refrigerant is conveyed to the compressor 128.

In the vapor cycle system 126, the vaporized refrigerant exiting the evaporator 134 is further heated within the subcooler 202 to a vapor phase, and the vaporized refrigerant is conveyed to the refrigerant compressor 128. The refrigerant compressor 128 pressurizes the refrigerant. The refrigerant compressor 128 is driven by the motor 130. The motor 130 may be powered by the electrical power source 150 (FIGS. 2 and 3) of the aircraft 10. The hot, pressurized refrigerant discharged from the refrigerant compressor 128 flows to the condenser 132, where heat from the refrigerant is transferred into the air stream within the ram air heat sink circuit 144. As shown in the illustrated embodiment, the vapor cycle system 126 may also include a regenerative heat exchanger called a subcooler 202 along the refrigerant loop 136 to improve efficiency of the vapor cycle system 126. The subcooler 202 allows heat transfer from the refrigerant that is downstream of the evaporator 134 with the refrigerant that is downstream of the condenser 132. The vapor cycle system 126 includes an expansion valve 204 disposed along the refrigerant loop 136 between the condenser 132 and the evaporator 134. More specifically, the expansion valve 204 is disposed upstream of the evaporator 134 between the subcooler 202 and the evaporator 134.

The condenser 132 is disposed in series with the heat exchanger 112 along the ram air heat sink circuit 144. For example, ram air entering the ram air heat sink circuit 144 through the first duct 178 flows through the condenser 132 and subsequently flows through the heat exchanger 112. The air stream within the ram air heat sink circuit 144 absorbs heat from the refrigerant within the condenser 132 and absorbs heat from the hybrid air stream within the heat exchanger 112 (e.g., when in the one or more ground configurations). The air conditioning pack 145 optionally includes a fan 206 within the ram air heat sink circuit 144. The fan 206 drives air flow through the ram air heat sink circuit 144 to ensure that the flow rate of the air stream is sufficient to dissipate a designated amount of heat while the aircraft is on the ground (and optionally during low speed flight conditions). The fan 206 is driven by a fan motor 208. Downstream of the heat exchanger 112, the air stream within the ram air heat sink circuit 144 is discharged from the air conditioning pack 145 and flows through the exhaust duct 166 (also shown in FIG. 2) before being dispelled from the aircraft 10 through the exhaust port 164 (FIG. 2).

The hybrid air stream exiting the evaporator 134 may flow through the condenser 194 and the water extractor 196 before reaching the turbine 120. The condenser 194 may remove additional heat from the hybrid air stream to ensure that the air entering the water extractor 196 is sufficiently cool to condense to a liquid some of the water in the air. Within the condenser 194, heat from the hybrid air stream exiting the evaporator 134 (upstream of the turbine 120) may be transferred into the hybrid air stream downstream of the turbine 120. The water extractor 196 dries the hybrid air stream via removal of liquid water droplets. The water extracted from the hybrid air stream may be directed through a water conduit 210 and injected into the ram air heat sink circuit 144 upstream of the condenser 132 to increase the through mass addition the available heat sink of the air stream within the ram air heat sink circuit 144.

Downstream of the water extractor 196, the hybrid air stream enters the turbine 120. The energy of the hybrid air stream flowing through the rotor blades and vanes of the turbine 120 drives the rotation of the air compressor 118 via the shaft 122 while at the same time reducing the temperature of the air. In at least one embodiment, when the air conditioning pack 145 is in the one or more ground configurations, all of the bleed air entering the air conditioning pack 145 may be directed through the turbine 120 to power compression of ram air within the air compressor 118 and reduce the temperature of the hybrid air stream. For example, in the illustrated embodiment, substantially all of the bleed air and substantially all of the ram air that is compressed by the air compressor 118 flows through the turbine 120 before being discharged from the air conditioning pack 145 through the outlet port 140 (FIG. 3) to be used for cooling within the aircraft 10. Once the hybrid air stream is expanded through the turbine 120, the hybrid air stream may flow through the condenser 194 and absorb some heat from the upstream hybrid air stream before being discharged from the air conditioning pack 145 along the supply air duct 161 (also shown in FIG. 2). The air conditioning pack 145 is configured to condition the hybrid air stream to a designated temperature, pressure, and humidity. In a non-limiting example, the hybrid air stream discharged along the supply air duct 161 may have a temperature below 32 degrees Fahrenheit (F), such as between 0 and 20 degrees F.

FIG. 5 is a schematic diagram of the cooling system 115 showing the air conditioning pack 145 in a second ground configuration according to an embodiment of the present disclosure. The second ground configuration is similar to the first ground configuration shown in FIG. 4, except that the vapor cycle system 126 is inactive (e.g., off) in the second ground configuration. The vapor cycle system 126 is selectively turned on and off by controlling the motor 130 that drives the refrigerant compressor 128, such that the vapor cycle system 126 is active or "on" when the motor 130 is operating, and the vapor cycle system 126 is inactive or "off" when the motor 130 is not operating. In at least one embodiment, the control circuit 146 may be configured to deactivate the motor 130 to turn off the vapor cycle system 126 in response to one or more designated conditions or circumstances. The control circuit 146 may deactivate the motor 130 when the aircraft 10 is on the ground based on a measured temperature of the ambient environment outside of the aircraft 10. For example, if the temperature of the ambient environment is below a designated threshold temperature, then the additional cooling provided by the vapor cycle system 126 may not be necessary. The ram air may be sufficiently cool to condition the hybrid air stream while the vapor cycle system 126 is not active to conserve the energy used to power the motor 130. The threshold temperature may be specific to different aircraft models, conditioned air requirements, component capabilities, and/or operator preferences. Non-limiting examples of temperatures that could be used as the threshold temperature include 20 degrees F., 30 degrees F., 40 degrees F., and 50 degrees F. For example, if the threshold temperature is designated as 40 degrees F., then the control circuit 146 is configured to activate the motor 130 (to turn on the vapor cycle system 126) when the ambient temperature is at or above 40 degrees F., and is configured to deactivate the motor 130 (to turn off the vapor cycle system 126) when the ambient temperature is below 40 degrees F.

When the air conditioning pack 145 is in the second ground configuration with the vapor cycle system 126 turned off, the air conditioning flow circuit 170 may be the same or similar to the air conditioning flow circuit 170 when in the first ground configuration with the vapor cycle system 126 operating. Optionally, the air conditioning flow circuit 170 may slightly change when the vapor cycle system 126 is turned off to transition from the first ground configuration to the second ground configuration.

In the second ground configuration illustrated in FIG. 5, the first and second bypass valves 172A, 172B are closed to prevent air flow through the heat exchanger bypass line 188 and the evaporator bypass line 190, respectively. The control circuit 146 partially opens the third bypass valve 172C to allow some of the hybrid air stream downstream of the heat exchanger 112 and the evaporator 134 to bypass the turbine 120 through the hot bypass line 192. The portion of the hybrid air stream that bypasses the turbine 120 through the hot bypass line 192 is not used for pressurizing the ram air at the air compressor 118, while the remaining portion of the hybrid air stream that flows through the turbine 120 is used for pressurizing the ram air. The hybrid air stream within the hot bypass line 192 blends with the hybrid air stream that is discharged from the turbine 120 within the third mixing duct 138C before exiting the air conditioning pack 145 through the outlet port 140 (FIG. 3). The control circuit 146 may open the third bypass valve 172C in order to control the temperature of the air that exits the air conditioning pack 145 and is supplied to the passenger cabin 28 (FIG. 2) and/or other areas of the aircraft 10. For example, the portion of the hybrid air stream that bypasses the turbine 120 through the hot bypass line 192 is at a greater temperature than the portion of the hybrid air stream that is expanded through the turbine 120. The air in the hot bypass line 192 may be blended with the expanded air exiting the turbine 120 in order to increase the temperature of the conditioned air that is emitted from the air conditioning pack 145.

As shown in FIG. 5, when the vapor cycle system 126 is turned off, the evaporator 134 does not provide any cooling of the hybrid air stream, and the condenser 132 does not reject any heat into the ram air heat sink circuit 144. In the illustrated embodiment, the heat exchanger 112 is the only component that transfers heat from the air conditioning flow circuit 170 to the ram air heat sink circuit 144. The bleed air is supplied from the auxiliary power unit 152 (FIG. 2) in the second ground configuration, as in the first ground configuration shown in FIG. 4.

FIGS. 6 and 7 show the air conditioning pack 145 in respective first and second cruise flight configurations according to an embodiment of the present disclosure. As described above, the air conditioning pack 145 may be configured in one of the cruise flight configurations while the aircraft 10 is flying at altitude. In the first cruise flight configuration shown in FIG. 6, a modulating valve 172E (also referred to herein as second primary valve 172E) between the heat exchanger 112 and evaporator 134 is closed, while the modulating valve 172E is partially or fully open in the second cruise flight configuration shown in FIG. 7.

In the cruise flight configurations, the air conditioning pack 145 receives bleed air in the bleed air inlet duct 174 from one or more of the main engines 14 (shown in FIGS. 1 and 2) which represent the bleed air source 113 (FIG. 2). For example, in the cruise flight configurations, the bleed air may be received only from the main engine 14, and not from the auxiliary power unit 152. In at least one embodiment, the air compressor 118 of the air cycle assembly 116 is configured to pressurize the ram air to a pressure that corresponds to a cabin air pressure within the passenger cabin 28 and the flight deck 30 (both shown in FIG. 2). For example, the ram air exiting the air compressor 118 may have a pressure that is within a designated range of the cabin air pressure. The designated range may be within 1%, 3%, or 5% of the cabin air pressure.

In the first cruise flight configuration shown in FIG. 6 (where the modulating valve 172E is closed), the bleed air is cooled separately from the ram air. For example, the heat exchanger 112 cools the bleed air, and the evaporator 134 of the vapor cycle system 126 cools the ram air. The bleed air mixes with the ram air to form the hybrid air stream downstream of the heat exchanger 112 and the evaporator 134. For example, in the illustrated embodiment, the bleed air mixes with the ram air in the third mixing duct 138C. The heat exchanger 112 does not receive the ram air, and the evaporator 134 does not receive the bleed air in the illustrated embodiment.

The control circuit 146 individually controls the valves 172 along the air conditioning flow circuit 170 to achieve the selected one of the cruise flight configurations. In the illustrated embodiment of FIG. 6, the control circuit 146 opens all three of the first, second, and third bypass valves 172A, 172B, 172C to allow air flow through the heat exchanger bypass line 188, the evaporator bypass line 190, and the hot bypass line 192, respectively. The control circuit 146 closes a first primary valve 172D, the second primary (e.g., modulating) valve 172E, and a third primary valve 172F along the primary line 186. The first primary valve 172D is between the air compressor 118 and the heat exchanger 112. The third primary valve 172F is between the evaporator 134 and the turbine 120 (more specifically between the evaporator 134 and the condenser 194).

The bleed air entering the air conditioning pack 145 within the bleed air inlet duct 174 flows through the heat exchanger 112, where heat is transferred to the air stream within the ram air heat sink circuit 144. The bleed air exiting the heat exchanger 112 is directed through the second bypass valve 172B along the evaporator bypass line 190 directly to the turbine 120. For example, all of the bleed air that enters the air conditioning pack 145 may be directed to the turbine 120 for driving the air compressor 118. After expanding through the turbine 120, the bleed air mixes with the ram air in the third mixing duct 138C. The hybrid air stream is discharged from the air conditioning pack 145 along the supply air duct 161.

The ram air that is pressurized by the air compressor 118 is directed through the first bypass valve 172A along the heat exchanger bypass line 188 directly to the evaporator 134. When the vapor cycle system 126 is turned on, the refrigerant absorbs heat from the ram air within the evaporator 134 to cool the ram air. The ram air exiting the evaporator 134 is directed through the third bypass valve 172C along the hot bypass line 192 and mixes with the bleed air in the third mixing duct 138C before being discharged from the air conditioning pack 145 for cooling, ventilating, and/or pressurizing the aircraft 10.

Optionally, the motor 208 that powers the fan 206 in the ram air heat sink circuit 144 may be turned off by the control circuit 146 while the aircraft 10 is in flight. The flow rate of the ram air through the ram air heat sink circuit 144 may be sufficient to provide the required heat absorption, so energy that would be used to power the motor 208 is conserved.

Although not shown, in certain circumstances or conditions, the vapor cycle system 126 may be turned off while the air conditioning pack 145 is in one of the cruise flight configurations to produce additional cruise flight configurations of the air conditioning pack 145. For example, at high altitudes, the ambient air temperature may be low enough that the ram air does not require additional cooling by the vapor cycle system 126. In a third cruise flight configuration (not shown) that is a variation of the first cruise flight configuration shown in FIG. 6, the control circuit 146 may be configured to deactivate the motor 130 to turn off the vapor cycle system 126 in response to the ambient temperature outside of the aircraft 10 falling below a designated threshold temperature while in flight. The designated threshold temperature while in flight may be lower than the designated threshold temperature while the aircraft 10 is at ground level. Non-limiting examples of the designated threshold temperature while the aircraft 10 is in flight include −20 degrees F., −10 degrees F., 0 degrees F., and 10 degrees F. When the vapor cycle system 126 is turned off during a flight, the air conditioning flow circuit 170 may remain unchanged. For example, the air conditioning flow circuit 170 in the third cruise flight configuration may be the same or substantially the same as the air conditioning flow circuit 170 in the first cruise flight configuration shown in FIG. 6, although the vapor cycle system 126 is off.

FIG. 7 shows the air conditioning pack 145 in the second cruise flight configuration, according to an embodiment of the present disclosure. The only difference between the second cruise flight configuration shown in FIG. 7 and the first cruise flight configuration shown in FIG. 6 is that the control circuit 146 sets the second primary valve (e.g., modulating valve) 172E in a partially or fully open position in the second cruise flight configuration, whereas the second primary valve 172E is closed in the first cruise flight configuration. By opening the second primary valve 172E, most of the bleed air downstream of the heat exchanger 112 is directed through the second bypass valve 172B along the evaporator bypass line 190 directly to the turbine 120. A minor portion (e.g., less than half) of the bleed air is directed through the second primary valve 172E to the evaporator 134. The minor portion of the bleed air mixes with the ram air flowing along the heat exchanger bypass line 188 at the second mixing duct 138B, and the blended air stream enters the evaporator 134. The bleed air that is expanded through the turbine 120 mixes with the blended air stream (defined by the ram air and the minor portion of the bleed air) at the third mixing duct 138C prior to discharge from the air conditioning pack 145.

In the illustrated second cruise flight configuration, most of the bleed air is expanded through the turbine 120 for driving the air compressor 118, but the minor portion of the bleed air bypasses the turbine 120 and mixes with the ram air upstream of the evaporator 134. The second cruise flight configuration shown in FIG. 7 may be useful in certain circumstances, such as at very high altitudes, to ensure efficient operation of the air compressor 118. For example, allowing some of the bleed air to bypass the turbine 120 reduces the flow rate of ram air pressurized by the air compressor 118. While the air conditioning pack 145 operates in the second cruise flight configuration shown in FIG. 7, the vapor cycle system 126 may be turned off to transition to a fourth cruise flight configuration (not shown).

Figure 8:
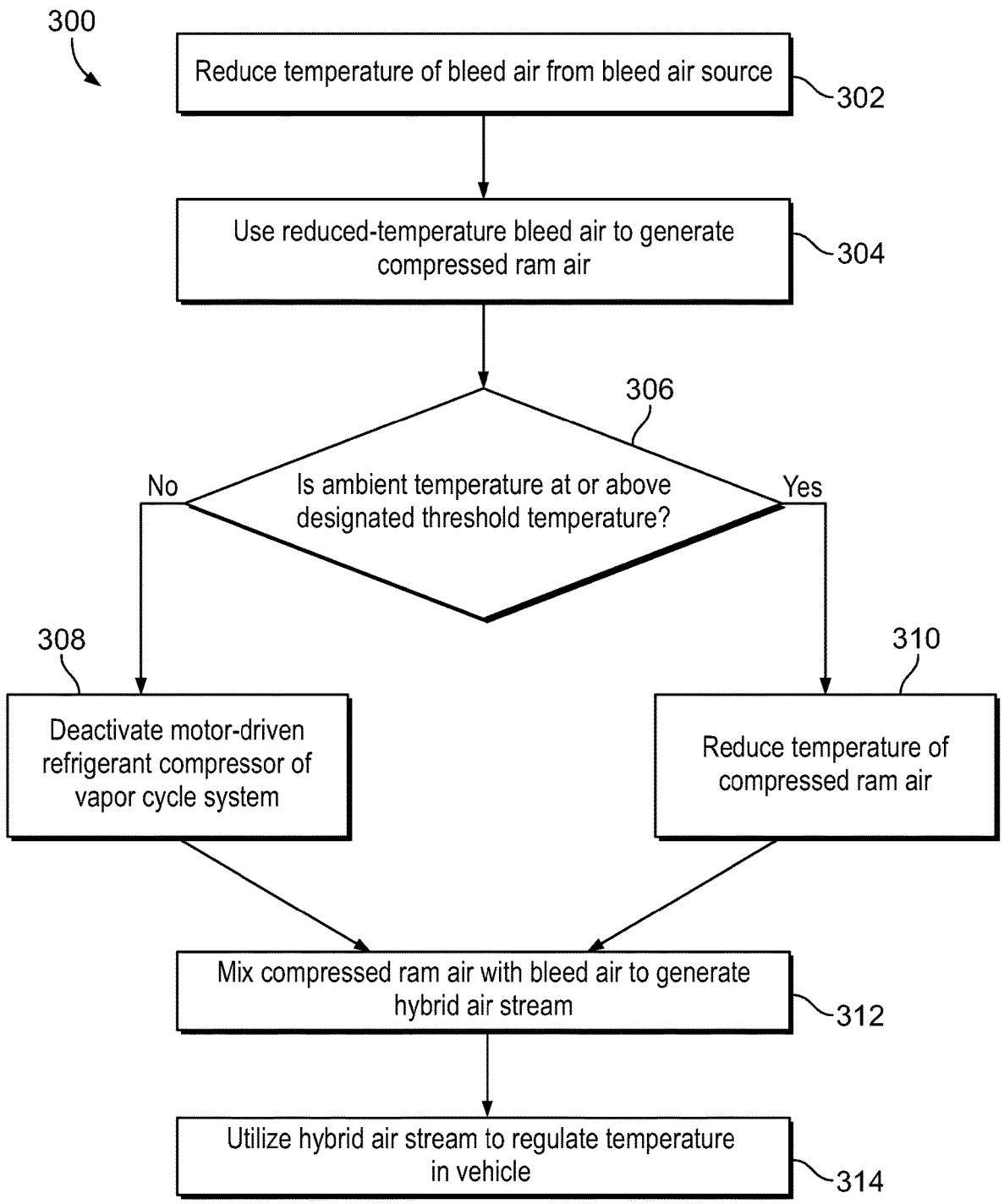
FIG. 8 is a flow chart of a method for conditioning air for use in a vehicle, according to an embodiment of the present disclosure.

FIG. 8 is a flow chart of a method 300 for conditioning air for use in a vehicle, according to an embodiment of the present disclosure. The method 300 may be performed according to the embodiments described herein with reference to FIGS. 1-7. For example, the method 300 may be used for conditioning air that is used for regulating temperature, ventilating, and/or pressurizing at least one compartment or space in the vehicle 10 shown in FIG. 1. The vehicle 10 is described as an aircraft herein (and is referred to as aircraft 10), but is not limited to an aircraft. The method 300 may be used on other types of transport vehicles, such as rail vehicles, buses, sea craft, and the like. The method 300 may be performed entirely or at least partially by the cooling system 115 shown in FIG. 2, including the air conditioning pack 145 and the control circuit 146.

At 302, an operating temperature of bleed air received from a bleed air source 113 is reduced. The bleed air source 113 may be a main engine 14 of the aircraft 10 or an auxiliary power unit 152. For example, the main engine 14 may supply the bleed air in cruise flight configurations of the air conditioning pack 145 when the aircraft 10 is in a cruise flight mode of operation, and the auxiliary power unit 152 may supply the bleed air in ground configurations when the aircraft 10 is in a ground mode of operation. The temperature-reduction of the bleed air may be achieved within a heat exchanger 112 that allows heat transfer from the bleed air into an air stream within a ram air heat sink circuit 144. The air stream within the ram air heat sink circuit 144 may be entirely or at least partially ram air from outside of the aircraft 10.

At 304, the reduced-temperature (e.g., cooled) bleed air is used to generate compressed ram air. For example, the bleed air from the heat exchanger 112 may be directed to an air cycle assembly 116 to be used for compressing ram air from outside of the aircraft 10. The bleed air may be expanded through a turbine 120 of the air cycle assembly 116. The air cycle assembly 116 includes an air compressor 118 mechanically coupled to the turbine 120 via a shaft 122. The expansion of the bleed air in the turbine 120 powers the turbine 120 to rotate the air compressor 118 via the shaft 122. The rotation of the air compressor 118 compresses ram air received at the air compressor 118 through a ram air inlet port 124.

At 306, it is determined whether the ambient temperature outside of the aircraft 10 is at or above a designated threshold temperature. For example, the control circuit 146 may be operably coupled to a temperature sensor such that the control circuit 146 determines the current temperature of the ambient air based on the temperature sensor. The designated threshold temperature may be based on a current operating mode of the vehicle (e.g., flight or ground). If the ambient temperature is at or above the designated threshold temperature, then flow proceeds to 310 from 306. At 310, an operating temperature of the compressed ram air is reduced. In one or more embodiments, the compressed ram air is directed to a vapor cycle system 126 that is configured to cool the compressed ram air. The vapor cycle system 126 includes a motor-driven refrigerant compressor 128 that uses energy supplied by the motor 130 to compress a refrigerant. The motor 130 may be powered by an electrical power source 150 on the aircraft 10. The compressed ram air is directed to an evaporator 134 of the vapor cycle system 126, where heat transfers from the compressed ram air to the refrigerant to cool the compressed ram air. Optionally, the bleed air may flow with the compressed ram air to the evaporator 134 such that the operating temperature of the bleed air is reduced concurrently with the compressed ram air.

If, on the other hand, the ambient temperature is less than the designated threshold temperature, flow proceeds to 308 and the motor-driven refrigerant compressor 128 is deactivated. Deactivating the refrigerant compressor 128 may effectively turn off the vapor cycle system 126. For example, if the ambient temperature is sufficiently cool, the vapor cycle system 126 may not be necessary to provide additional cooling for the compressed ram air. The refrigerant compressor 128 may be deactivated by the control circuit 146, or other control circuitry on the aircraft 10, deactivating the motor 130 that drives the refrigerant compressor 128.

Flow for the method 300 proceeds to 312 after either of steps 308 and 310. At 312, the compressed ram air is mixed with bleed air to generate a hybrid air stream. Although step 312 is presented after steps 302, 304, and 310 in the flow chart in FIG. 8, the chronological sequence of events may not follow the same order of presentation shown in FIG. 8. For example, depending on the specific configuration of the air conditioning pack 145 (as controlled by the control circuit 146 by opening and/or closing certain specific valves 172), the ram air may mix with the bleed air at different mixing ducts 138 throughout the air conditioning flow circuit 170. For example, in one or more ground configurations when the aircraft 10 is in a ground mode of operation at ground level, the ram air mixes with the bleed air in a first mixing duct 138A that is disposed upstream of the heat exchanger 112 between the heat exchanger 112 and the bleed air inlet port 114. Thus, the compressed air generated at step 304 may mix with incoming bleed air at 312, and the generated hybrid air stream may enter the heat exchanger 112. As a result, the temperature of the compressed ram air may be reduced at 302 concurrently with the reduction in the temperature of the bleed air at the heat exchanger 112. Alternatively, in one or more cruise flight configurations when the aircraft 10 is in a cruise flight mode of operation during flight at altitude, the ram air mixes with the bleed air downstream of the heat exchanger 112, such that only the bleed air (not the compressed ram air) is cooled in the heat exchanger 112 (e.g., at step 302). The mixing duct 138 may also be downstream of the vapor cycle system 126, such that only the compressed ram air (not the bleed air) is cooled within the vapor cycle system 126 (at step 310).

Although not shown in FIG. 8, the method 300 may include one or more steps of reconfiguring the air conditioning flow circuit 170 to switch configurations of the air conditioning pack 145. The reconfiguring steps may be performed by opening and closing certain specific valves 172 to control and set different respective flow paths for the compressed ram air and the bleed air within the air conditioning flow pack 145. The reconfiguration may be controlled by the control circuit 146, and may occur in response to the aircraft 10 transitioning between different modes of operation (e.g., from a ground mode of operation while on the ground to a cruise flight mode of operation during flight of the aircraft 10.

At 314, the hybrid air stream is utilized to regulate a temperature of at least one compartment in the aircraft 10. For example, the hybrid air stream may be discharged from the air conditioning pack 145 through an outlet port 140 and supplied to a passenger cabin 28, a flight deck 30, and/or other areas of the aircraft 10 to provide temperature control, ventilation, and/or pressurization.

As described herein, embodiments of the present disclosure provide conditioned air for a vehicle, such as an aircraft, that may utilize less bleed air extracted from an engine (e.g., a main engine and/or an auxiliary power unit) than known air conditioning systems while limiting the amount of external power required to drive the refrigerant compressor of the vapor cycle system. The embodiments described herein may also provide a more compact air conditioning pack than known air conditioning systems as the bleed air is mixed with the ram air within the air conditioning pack, such as within a common housing.

As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

As used herein, the term "controller," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An air conditioning pack comprising:
  an air cycle assembly including an air compressor mechanically coupled to a turbine, the turbine configured to receive bleed air and utilize the bleed air to compress ram air at the air compressor;
  a vapor cycle system including an evaporator and a motor-driven refrigerant compressor, the motor-driven refrigerant compressor configured to pressurize a refrigerant within the vapor cycle system, the evaporator configured to receive the compressed ram air and allow heat transfer from the compressed ram air to the refrigerant to reduce an operating temperature of the compressed ram air;
  a mixing duct configured to receive the compressed ram air and mix the compressed ram air with the bleed air to generate a hybrid air stream that is used for cooling at least a portion of a vehicle; and
  one or more processors operatively connected to the motor-driven refrigerant compressor and configured to deactivate the motor-driven refrigerant compressor in response to an ambient temperature outside of the vehicle falling below a designated threshold temperature.

2. The air conditioning pack of claim 1, further comprising a heat exchanger, the heat exchanger configured to reduce an operating temperature of the bleed air received from a bleed air source of the vehicle, the air cycle assembly configured to receive the bleed air from the heat exchanger.

3. The air conditioning pack of claim 1, wherein the air compressor is mechanically coupled to the turbine via a shaft, and the bleed air is expanded through the turbine to power the air compressor to compress the ram air.

4. The air conditioning pack of claim 1, further comprising a housing, wherein the air cycle assembly, the vapor cycle system, and the mixing duct are disposed within the housing.

5. The air conditioning pack of claim 1, wherein the air cycle assembly is configured to receive the bleed air from an auxiliary power unit on the vehicle.

6. The air conditioning pack of claim 1, wherein the air cycle assembly is configured to receive the bleed air from a main engine on the vehicle.

7. The air conditioning pack of claim 1, wherein the mixing duct is upstream of the vapor cycle system such that the vapor cycle system receives the hybrid air stream.

8. The air conditioning pack of claim 1, wherein the mixing duct is downstream of the air cycle assembly and the vapor cycle system.

9. The air conditioning pack of claim 1, wherein, in response to the vehicle being in a cruise flight mode of operation, the one or more processors are configured to direct at least a portion of the bleed air to bypass the vapor cycle system and to mix with the compressed ram air downstream of the vapor cycle system and the air cycle assembly.

10. The air conditioning pack of claim 2, wherein, in response to the vehicle being in a first ground configuration, the one or more processors are configured to direct the compressed ram air to mix with the bleed air in the mixing duct upstream of the heat exchanger such that the turbine of the air cycle assembly receives the hybrid air stream.

11. The air conditioning pack of claim 1, wherein the vehicle is an aircraft.

12. A vehicle comprising:
an air conditioning pack comprising:
an air cycle assembly including an air compressor mechanically coupled to a turbine, the turbine configured to receive bleed air and utilize the bleed air to compress ram air at the air compressor;
a vapor cycle system including an evaporator disposed along a refrigerant loop that contains a refrigerant, the evaporator configured to receive the refrigerant and the compressed ram air and allow heat transfer from the compressed ram air to the refrigerant to reduce an operating temperature of the compressed ram air; and
a mixing duct configured to receive the compressed ram air and mix the compressed ram air with the bleed air to generate a hybrid air stream that is used for cooling at least a portion of the vehicle; and
a one or more processors operatively connected to the air conditioning pack, the one or more processors configured to control respective flow paths for the bleed air and the ram air through the air conditioning pack based on one or more of a mode of operation of the vehicle or an ambient environmental condition outside of the vehicle,
wherein, in response to the vehicle being in a cruise flight mode of operation, the one or more processors are configured to direct at least a portion of the bleed air to bypass the vapor cycle system and to mix with the compressed ram air downstream of the vapor cycle system and the air cycle assembly.

13. The vehicle of claim 12, wherein the air compressor is mechanically coupled to the turbine via a shaft, and the bleed air is expanded through the turbine to power the air compressor to compress the ram air.

14. The vehicle of claim 12, wherein the air conditioning pack includes a housing, wherein the air cycle assembly, the vapor cycle system, and the mixing duct are disposed within the housing.

15. The vehicle of claim 12, wherein, in response to the vehicle being in a ground mode of operation, the one or more processors are configured to direct the compressed ram air to mix with the bleed air in the mixing duct upstream of the vapor cycle system such that the vapor cycle system receives the hybrid air stream.

16. The vehicle of claim 12, wherein the vapor cycle system includes a motor-driven refrigerant compressor to pressurize the refrigerant within the refrigerant loop.

17. The vehicle of claim 16, wherein the one or more processors are configured to activate the motor-driven refrigerant compressor in response to an ambient temperature outside of the vehicle being at least a designated threshold temperature, and is configured to deactivate the motor-driven refrigerant compressor in response to the ambient temperature being below the designated threshold temperature.

18. A method for conditioning air for use in a vehicle comprising:
using bleed air received at a turbine from a bleed air source to generate compressed ram air at an air compressor;
reducing an operating temperature of the compressed ram air within an evaporator of a vapor cycle system;
directing at least a portion of the bleed air exiting the turbine to bypass the evaporator of the vapor cycle system;
mixing the at least the portion of the bleed air that bypasses the evaporator with the compressed ram air in a mixing duct downstream of the turbine and the evaporator to generate a hybrid air stream; and
utilizing the hybrid air stream to regulate a temperature of at least one compartment in the vehicle.

19. The method of claim 18, further comprising reducing an operating temperature of the bleed air from the bleed air source prior to using the bleed air to generate the compressed ram air.

20. The method of claim 18, wherein the vapor cycle system includes a motor-driven refrigerant compressor, the method further comprising deactivating the motor-driven refrigerant compressor in response to an ambient temperature outside of the vehicle being below a designated threshold temperature.

* * * * *